US009671951B2

(12) United States Patent
Chi et al.

(10) Patent No.: US 9,671,951 B2
(45) Date of Patent: Jun. 6, 2017

(54) METHOD FOR ZOOMING SCREEN AND ELECTRONIC APPARATUS AND COMPUTER READABLE MEDIUM USING THE SAME

(71) Applicant: HTC Corporation, Taoyuan County (TW)

(72) Inventors: Wen-Yuan Chi, Taoyuan County (TW); Chuan-Feng Yeh, Taoyuan County (TW); Sheng-Hsin Huang, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 371 days.

(21) Appl. No.: 14/049,217

(22) Filed: Oct. 9, 2013

(65) Prior Publication Data

US 2014/0115544 A1    Apr. 24, 2014

Related U.S. Application Data

(60) Provisional application No. 61/711,229, filed on Oct. 9, 2012.

(51) Int. Cl.
*G06F 3/0488* (2013.01)

(52) U.S. Cl.
CPC ........ *G06F 3/0488* (2013.01); *G06F 3/04883* (2013.01); *G06F 2203/04806* (2013.01)

(58) Field of Classification Search
None
See application file for complete search history.

(56) References Cited

U.S. PATENT DOCUMENTS

| 7,487,447 | B1 * | 2/2009 | Jerger | G06F 3/0481 |
| | | | | 715/252 |
| 9,007,405 | B1 * | 4/2015 | Eldar | G09G 5/02 |
| | | | | 345/666 |
| 9,317,196 | B2 * | 4/2016 | Fong | G06F 3/0488 |
| 2002/0149605 | A1 * | 10/2002 | Grossman | G06F 3/0485 |
| | | | | 345/660 |

(Continued)

FOREIGN PATENT DOCUMENTS

| CN | 1770255 | 5/2006 |
| CN | 102339275 | 2/2012 |

(Continued)

OTHER PUBLICATIONS

"Office Action of Taiwan Counterpart Application", issued on Mar. 9, 2015, p. 1-p. 7.

(Continued)

*Primary Examiner* — Phenuel Salomon
(74) *Attorney, Agent, or Firm* — Jianq Chyun IP Office

(57) ABSTRACT

A method for zooming screen, an electronic apparatus and a computer readable medium using the same are provided. The method is adapted to an electronic apparatus having a touch screen. Firstly, a zooming gesture is detected by utilizing the touch screen. Next, a screen object acted by the zooming gesture on the touch screen is searched. Afterwards, a specific part of the screen object and a screen edge of the touch screen are used as a reference to zoom all of objects displayed in a screen of the touch screen, such that a height of the specific part of the screen object is constantly maintained during zooming the screen.

11 Claims, 5 Drawing Sheets

(56) References Cited

U.S. PATENT DOCUMENTS

| | | | | |
|---|---|---|---|---|
| 2003/0014445 A1* | 1/2003 | Formanek | G06F 17/211 | 715/247 |
| 2004/0037470 A1* | 2/2004 | Simske | G06F 17/273 | 382/229 |
| 2005/0131887 A1* | 6/2005 | Rohrabaugh | G06F 9/4443 | |
| 2005/0174451 A1* | 8/2005 | Nozaki | H04N 5/232 | 348/240.99 |
| 2007/0204220 A1* | 8/2007 | Petrov Nickolov | G06F 17/30905 | 715/234 |
| 2007/0234203 A1* | 10/2007 | Shagam | G06F 17/211 | 715/210 |
| 2008/0252662 A1* | 10/2008 | Hyatt | G06F 3/0481 | 345/660 |
| 2009/0109243 A1* | 4/2009 | Kraft | G06F 3/0481 | 345/660 |
| 2009/0225038 A1* | 9/2009 | Bolsinga | G06F 3/04883 | 345/173 |
| 2010/0331043 A1* | 12/2010 | Chapman | G01C 21/20 | 455/556.1 |
| 2011/0035701 A1* | 2/2011 | Williams | G06F 3/0481 | 715/784 |
| 2011/0035702 A1* | 2/2011 | Williams | G06F 3/0481 | 715/800 |
| 2011/0107206 A1* | 5/2011 | Walsh | G06F 17/2785 | 715/256 |
| 2011/0109581 A1* | 5/2011 | Ozawa | G06F 3/0481 | 345/173 |
| 2011/0231746 A1* | 9/2011 | Rohrabaugh | G06F 9/4443 | 715/205 |
| 2012/0110438 A1* | 5/2012 | Peraza | G06F 17/214 | 715/243 |
| 2012/0174029 A1* | 7/2012 | Bastide | G06F 3/0488 | 715/800 |
| 2013/0042199 A1* | 2/2013 | Fong | G06F 3/0488 | 715/780 |
| 2013/0104027 A1* | 4/2013 | Bennett | G06F 17/212 | 715/234 |
| 2013/0111332 A1* | 5/2013 | Davis | G06F 3/0488 | 715/247 |
| 2013/0176344 A1* | 7/2013 | Mandic | G06F 3/04883 | 345/661 |

FOREIGN PATENT DOCUMENTS

| | | |
|---|---|---|
| CN | 102375688 | 3/2012 |
| CN | 102662566 | 9/2012 |
| TW | 200939095 | 9/2009 |
| TW | 201044252 | 12/2010 |
| TW | 201216143 | 4/2012 |

OTHER PUBLICATIONS

"Office Action of Taiwan Counterpart Application", issued on Jul. 14, 2015, p. 1-p. 6.

"Office Action of China Counterpart Application," issued on Feb. 22, 2016, p. 1-p. 7.

* cited by examiner

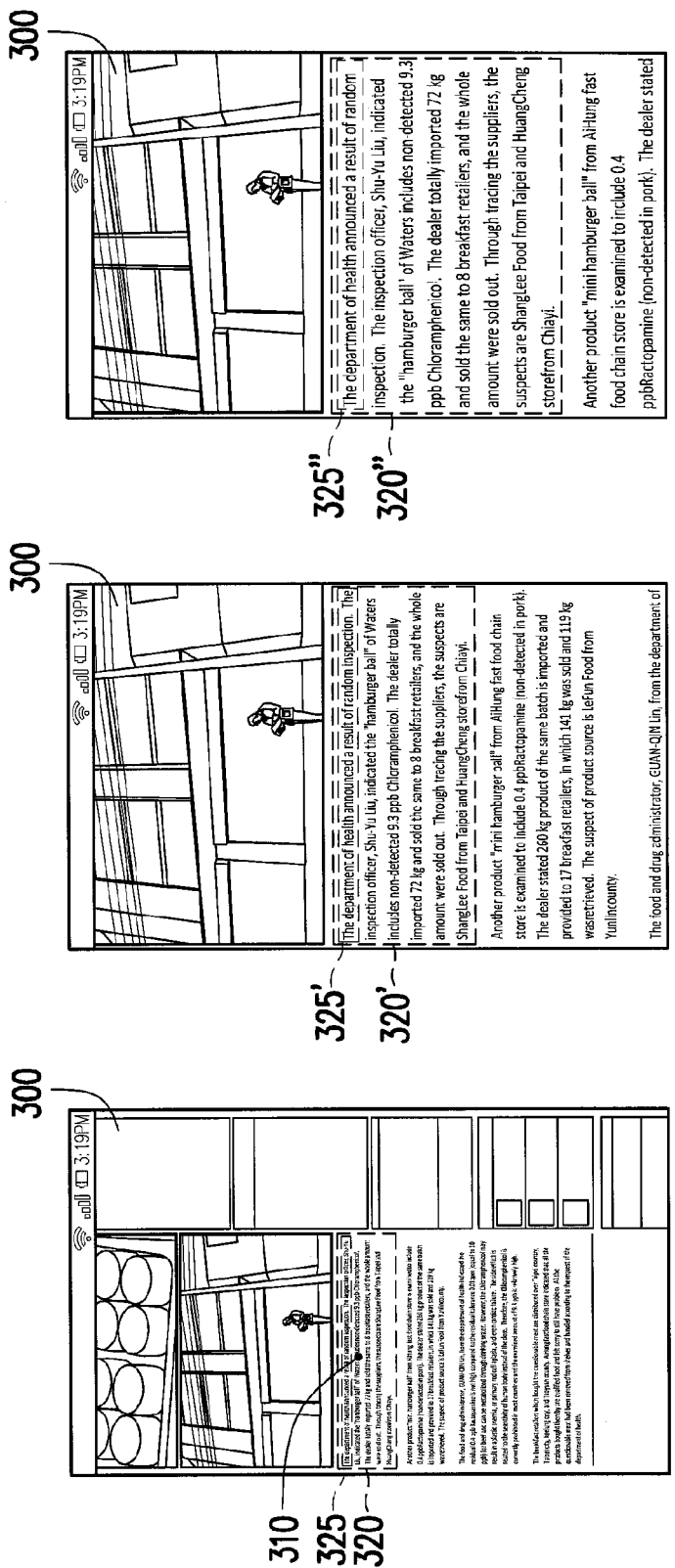

METHOD FOR ZOOMING SCREEN AND ELECTRONIC APPARATUS AND COMPUTER READABLE MEDIUM USING THE SAME

CROSS-REFERENCE TO RELATED APPLICATION

This application claims the priority benefits of U.S. provisional application Ser. No. 61/711,229, filed on Oct. 9, 2012. The entirety of the above-mentioned patent application is hereby incorporated by reference herein and made a part of this specification.

BACKGROUND OF THE APPLICATION

Field of the Application

The application relates to an operating method for a user interface and an electronic apparatus using the same, and more particularly, to a method for zooming screen and an electronic apparatus using the same.

Description of Related Art

With the development of technologies, browsing various information on electronic apparatuses such as smart phones, tablets and so on have become a part of people's daily life. When a user intends to view a picture, an article or a page including both pictures and texts (e.g., a web page) through said electronic apparatus, in order to examine details in the picture or for convenience in reading a text content, the user may perform gestures such as a tap, a double tap, a pinch on objects displayed by the touch screen through a touch screen of the electronic apparatus, so as to zoom a screen of the electronic apparatus to change sizes of the objects in the screen.

However, during the electronic apparatus zooming the screen, because a display area of the touch screen is limited, sizes, positions and arrangements of the objects previously displayed in the screen may be changed in order to preferably display the objects after zooming in the limited display area. Accordingly, the content previously followed by the user may deviate from its original position along with changes in zooming screen, or even disappeared in the screen after zooming, such that the content previously followed by the user may not be found for it is lost in the screen after zooming.

SUMMARY OF THE APPLICATION

Accordingly, the application is directed to a method for zooming screen and an electronic apparatus using the same, allowing a user to easily find information previously followed in a screen after zooming.

The application provides a method for zooming screen which is adapted to an electronic apparatus having a touch screen. The method includes the following steps. First, a zooming gesture is detected by utilizing the touch screen. Next, a screen object acted by the zooming gesture on the touch screen is searched. Afterwards, a specific part of the screen object and a screen edge of the touch screen are used as a reference to zoom all of objects displayed in a screen of the touch screen, such that a height of the specific part of the screen object is constantly maintained during zooming the screen.

In an example of the application, the step of searching the screen object acted by the zooming gesture on the touch screen includes: searching the screen object closest to a position of the zooming gesture on the touch screen to serve as the screen object acted by the zooming gesture.

In an example of the application, the step of searching the screen object closest to the position of the zooming gesture on the touch screen includes: defining a nine-square division with the position of the zooming gesture as a center; and searching the screen object appeared within the nine-square division and located at one square among the nine-square division closest to the position of the zooming gesture.

In an example of the application, the screen object is a text paragraph. Further, the step of zooming all of the objects displayed in the screen of the touch screen by using the specific part of the screen object and the screen edge of the touch screen as the reference further includes: constantly maintaining the height of a first line in the text paragraph during zooming the screen.

In an example of the application, the screen object is a picture. Further, the step of zooming all of the objects displayed in the screen of the touch screen by using the specific part of the screen object and the screen edge of the touch screen as the reference further includes: constantly maintaining the height of a pixel row corresponding to the position of the zooming gesture in the picture during zooming the screen.

In an example of the application, after the step of zooming all of the objects displayed in the screen of the touch screen by using the specific part of the screen object and the screen edge of the touch screen as the reference, the method further includes: rearranging at least one text paragraph in the screen according to a screen width of the touch screen, such that a width of each line in the text paragraph is matched to the screen width of the touch screen.

An electronic device of the application includes a touch screen, a storage unit and a processing unit. The storage unit is configured to store a plurality of modules. The processing unit is coupled to the touch screen and the storage unit, and configured to access and execute the modules stored by the storage module. The modules include a detecting module, a searching module, and a zooming module. The detecting module detects a zooming gesture by utilizing the touch screen. The searching module searches a screen object acted by the zooming gesture on the touch screen. The zooming module zooms all of objects displayed in a screen displayed by the touch screen by using a specific part of the screen object and a screen edge of the touch screen as a reference, such that a height of the specific part of the screen object is constantly maintained and an object edge of the screen object is aligned with the screen edge during zooming the screen.

In an example of the application, the searching module searches the screen object closest to a position of the zooming gesture on the touch screen to serve as the screen object acted by the zooming gesture.

In an example of the application, the searching module defines a nine-square division with the position of the zooming gesture as a center, and searches the screen object appeared within the nine-square division and located at one square among the nine-square division closest to the position of the zooming gesture.

In an example of the application, the screen object is a text paragraph, and the zooming module constantly maintains the height of a first line in the text paragraph during zooming the screen.

In an example of the application, the screen object is a picture, and the zooming module constantly maintains the height of a pixel row corresponding to the position of the zooming gesture in the picture during zooming the screen.

In an example of the application, the electronic apparatus includes an adjusting module. The adjusting module is configured to rearrange at least one text paragraph in the screen according to a screen width of the touch screen, such that a width of each line in the text paragraph is matched to the screen width of the touch screen.

In an example of the application, the zooming gesture includes a tap, a double tap or a pinch.

The application provides a computer readable medium for recording a program configured to be loaded by an electronic apparatus to execute the following steps. First, a zooming gesture is detected by utilizing the touch screen of the electronic apparatus. Next, a screen object acted by the zooming gesture on the touch screen is searched. Afterwards, a specific part of the screen object and a screen edge of the touch screen are used as a reference to zoom all of objects displayed in a screen of the touch screen, such that a height of the specific part of the screen object is constantly maintained during zooming the screen.

Based on above, in the method for zooming screen, the electronic apparatus and the computer readable medium using the same proposed in the examples of the application, when the zooming gesture is detected, each of the objects in the screen may be zoomed according to the type of the screen object acted by the zooming gesture while constantly maintaining the height of the specific part of the screen object in the screen. As a result, the user may easily find the information previously followed in the screen after zooming.

To make the above features and advantages of the disclosure more comprehensible, several examples accompanied with drawings are described in detail as follows.

BRIEF DESCRIPTION OF THE DRAWINGS

FIG. 3A to FIG. 3C are schematic diagrams for zooming screen according to an example of the application.

DESCRIPTION OF THE EXAMPLES

Figure 1:
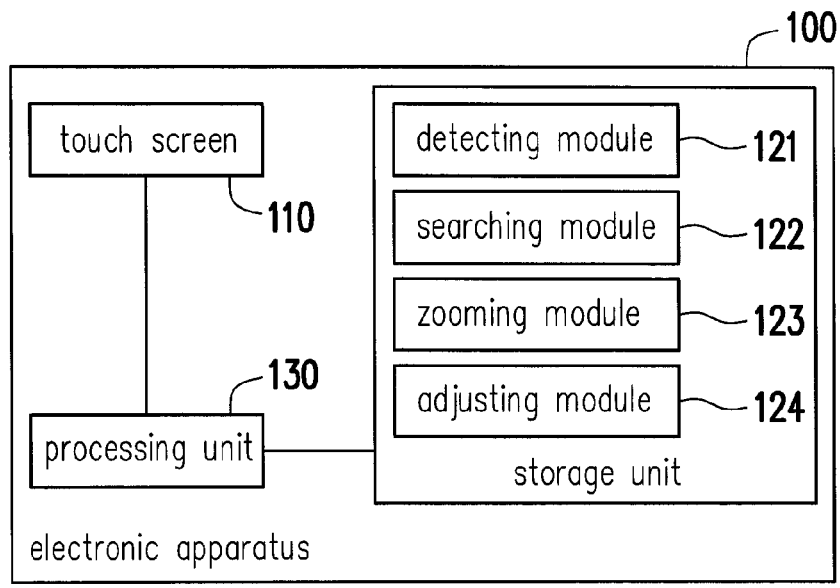
FIG. 1 is a functional block diagram illustrating an electronic apparatus according to an example of the application.

FIG. 1 is a functional block diagram illustrating an electronic apparatus according to an example of the application. In the present example, an electronic apparatus 100 includes a touch screen 110, a storage unit 120 and a processing unit 130. The electronic apparatus 100 is, for example, a smart phone, a tablet computer, a personal digital assistant (PDA) or other devices capable of displaying a screen through the touch screen and receiving commands entered by a user. The storage unit 120 is, for example, a memory, a hard disk or other devices capable of storing data for recording a plurality of modules. The modules include a detecting module 121, a searching module 122, a zooming module 123 and an adjusting module 124. Said modules may be stored in the storage unit 120 as program codes.

The processing unit 130 is coupled to the touch screen 110 and the storage unit 120, and may be, for example, a central processing unit (CPU) or other programmable devices for general purpose or special purpose such as a microprocessor and a digital signal processor (DSP), a programmable controller, an application specific integrated circuit (ASIC), a programmable logic device (PLD) or other similar devices or a combination of above-mentioned devices. The processing unit 130 is configured to access and execute the detecting module 121, the searching module 122, the zooming module 123 and the adjusting module 124 as recorded in the storage unit 120.

Figure 2:
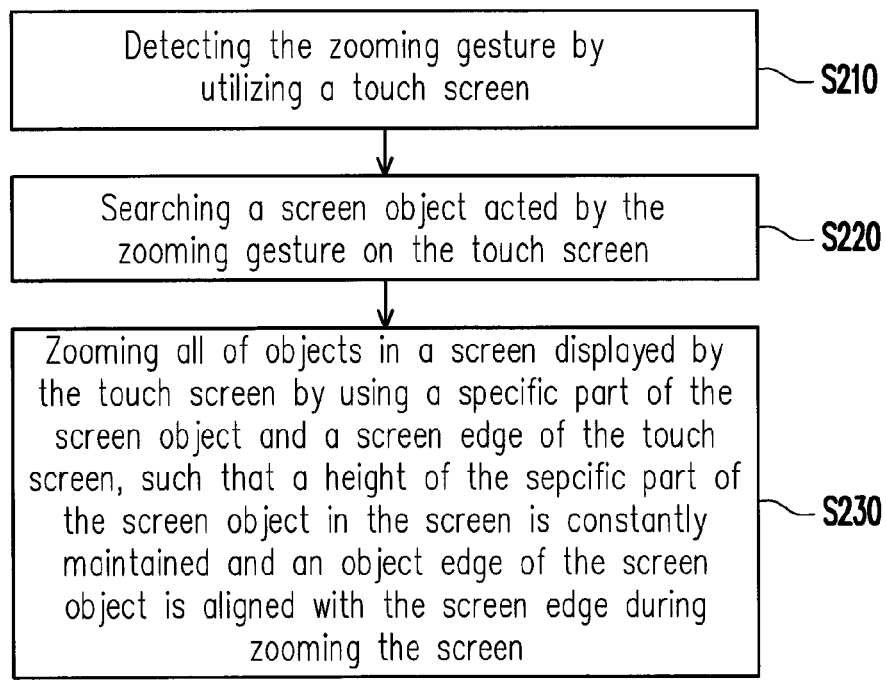
FIG. 2 is a flowchart of a method for zooming screen according to an example of the application.

The electronics apparatus 100 proposed in the present example may execute a method for zooming screen as described in an example of FIG. 2 when a zooming gesture for zooming the screen entered by the user is detected, such that even after zooming the screen, the user may still easily find a screen object previously followed before the screen is zoomed. Detailed description is provided as below.

FIG. 2 is a flowchart of a method for zooming screen according to an example of the application. The method proposed by the present example may be implemented by the electronic apparatus 100 depicted in FIG. 1, and each step of the present example would be described in detail with reference to the elements depicted in FIG. 1.

In step S210, the detecting module 121 may detect a zooming gesture by utilizing the touch screen 110. The zooming gesture is, for example, a tap, a double tap or a pinch, but the application is not limited thereto.

Next, when the zooming gesture is detected by the detecting module 121, the searching module 122 may execute step S220 to search a screen object acted by the zooming gesture on the touch screen 110. For instance, in case the user taps a text paragraph displayed by the touch screen 110, the searching module 122 may correspondingly find this text paragraph. For another example, in case the user pinches a picture, the searching module 122 may then correspondingly find the picture. In addition, when the user operates the screen object of other types (e.g. a video player, a screen button, an icon and/or a flash object) by using the zooming gesture, the searching module 122 may also correspondingly find said screen objects by executing step S220. Further, in case the user performs the zooming gesture on a blank area of the screen displayed by the touch screen 110, the searching module 122 may still search the screen object closest to the position of the zooming gesture on the touch screen to serve as the screen object acted by the zooming gesture. In other examples, the searching module 122 may search the screen object acted by the zooming gesture by using a specific method, which will be described in detail later.

Afterwards, in step S230, the zooming module 123 uses a specific part of the screen object and a screen edge of the touch screen 110 as a reference to zoom all of objects displayed in the screen of the touch screen 110, such that a height of the specific part of the screen object is constantly maintained during zooming the screen. It should be noted that, in step S230, the zooming module 123 may adaptively adjust executing details according to types of the screen object acted by the zooming gesture. Said types of the screen object include a text paragraph, a picture and so on, an example is provided below to further describe each of the types.

Furthermore, in other examples, after step S230, the adjusting module 124 may further rearrange the text paragraph in the screen according to a screen width of the touch screen 110, such that a width of each line in the text paragraph is matched to the screen width of the touch screen 110. More specifically, the adjusting module 124 may determine a number of words to be accommodated in each line according to a proportion between the screen width and a size of character after zoom in, so as to adjust an arrangement of paragraphs the text paragraph.

In an example, in case the found screen object is the text paragraph, the zooming module 123 may zoom the screen by using a first line of the text paragraph as the reference, so that the height of the first line is constantly maintained during zooming the screen. Accordingly, from the user's prospective, because the height of the first line in the text paragraph is constantly maintained during zooming the screen, the user may easily find the text previously read through the first line. FIG. 3A to FIG. 3C are provided below to explain the concept of the present example more clearly.

FIG. 3A to FIG. 3C are schematic diagrams for zooming screen according to an example of the application. Referring to FIG. 3A, it is assumed that the screen displayed by the touch screen 110 is a web page 300 in the present example. In the present example, when the user performs the zooming gesture (such as the double tap) on a touch position 310, since the touch position 310 is located in a text paragraph 320, the searching module 122 may correspondingly find the text paragraph 320.

After the text paragraph 320 is found by the searching module 122, the zooming module 123 may zoom in all of objects (e.g., pictures and every word) in the web page 300 as shown in FIG. 3B. During the procedure of zooming in of the web page 300, the zooming module 123 zooms in the web page 300 by using a first line 325 of the text paragraph 320 and a left edge of the touch screen 110 (i.e., a left edge of the web page 300) as the reference, such that the left edge of the text paragraph 320 after zoom in is aligned with the left edge of the touch screen 110, and the height of the first line 325 of the text paragraph 320 is constantly maintained. During zoom in of the web page 300, the test paragraph 320 first becomes a text paragraph 320' as shown in FIG. 3B, and then zooms in to a text paragraph 320" as shown in FIG. 3C.

In addition, the width of each of the test paragraphs in the web page 300 after being zoomed in may exceed the screen width of the touch screen 110, thus the adjusting module 124 could further rearrange each of the text paragraphs properly, such that a width of each line in each of the text paragraphs is matched to the screen width of the touch screen 110.

It could be observed from FIG. 3A to FIG. 3C that the heights of the first line 325 of the text paragraph 320, a first line 325' of the text paragraph 320', and a first line 325" of the text paragraph 320" are identical to each other. Accordingly, from the user's prospective, even though the text paragraph 320 followed by the user is rearranged during zoom in, the user may still easily find the text paragraph previously followed in the screen object after zoom in according to the first line having a fixed height.

Figures 4A, 4B, 4C:
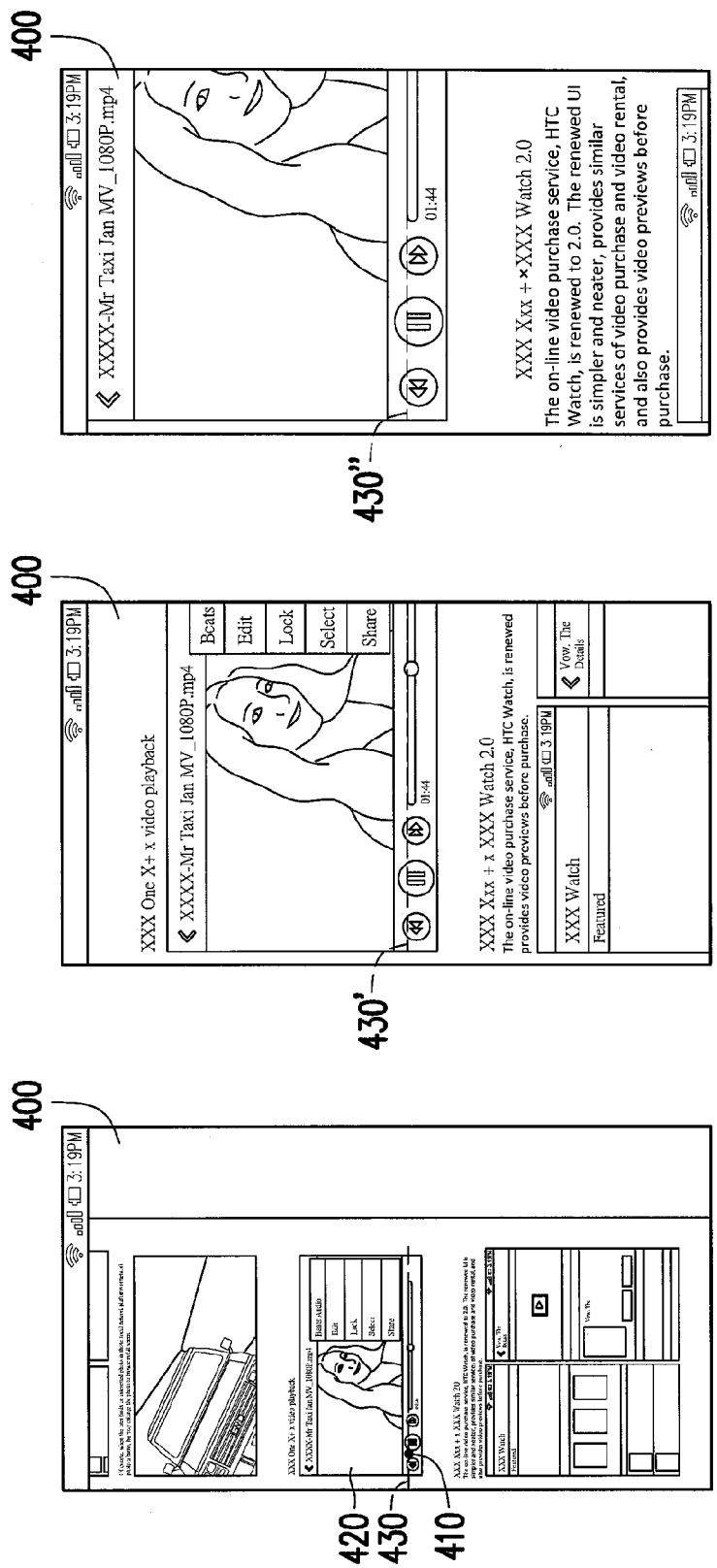
FIG. 4A to FIG. 4C are schematic diagrams for zooming screen according to an example of the application.

In other examples, in case the type of the screen object found by the searching module 122 is different from the text paragraph, the zooming module 123 may also execute step S230 by adopting other methods. For instance, in case the screen object found is the picture, the zooming module 123 may zoom the screen by using a pixel row corresponding to the position of the zooming gesture in the picture as the reference, so that the height of the pixel row is constantly maintained during zooming the screen. Accordingly, from the user's prospective, because the height of the pixel row corresponding to the position of the zooming gesture in the picture is constantly maintained during zooming the screen, the user may easily find the picture previously viewed. FIG. 4A to FIG. 4C are provided below to explain the concept of the present example more clearly.

FIG. 4A to FIG. 4C are schematic diagrams for zooming screen according to an example of the application. Referring to FIG. 4A, it is assumed that the screen displayed by the touch screen 110 is a web page 400 in the present example. In the present example, when the zooming gesture such as the double tap is acted by the user on a touch position 410, since the touch position 410 is located in a picture 420, the searching module 122 may correspondingly find the picture 420.

After the picture 420 is found by the searching module 122, the zooming module 123 may zoom in all of objects (e.g., pictures or each word) in the web page 400 as shown in FIG. 4B. During zoom in of the web page 400, the zooming module 123 zooms in the web page 400 by using a pixel row 430 corresponding to the touch position 410 and a left edge of the touch screen 110 (i.e., a left edge of the web page 400) as the reference, such that the left edge of the picture 420 after zoom in is aligned with the left edge of the touch screen 110, and the height of the pixel row 430 corresponding to the touch position 410 in the picture 420 is constantly maintained. During zoom in of the web page 400, the picture 420 first becomes a picture 420' as shown in FIG. 4B, and then zoom in to a picture 420" as shown in FIG. 4C.

It could be observed from FIG. 4A to 4C that the heights of the pixel row 430, a pixel row 430' and a pixel row 430" are identical to each other. Accordingly, from the user's prospective, a part of the picture previously followed by the user may be easily found in the web page 400 after zoom in.

Besides the implementation for the zooming gesture located on the text paragraph or the picture as described above, in case the zooming gesture is located on the blank area in the screen, the application is also capable of searching objects in the screen which may be interested by the user according to a viewing habit of the user. Accordingly, the screen may be zoomed so that the user may easily find the screen object previously followed before zooming the screen. Another example is given for illustration below.

Figure 5:
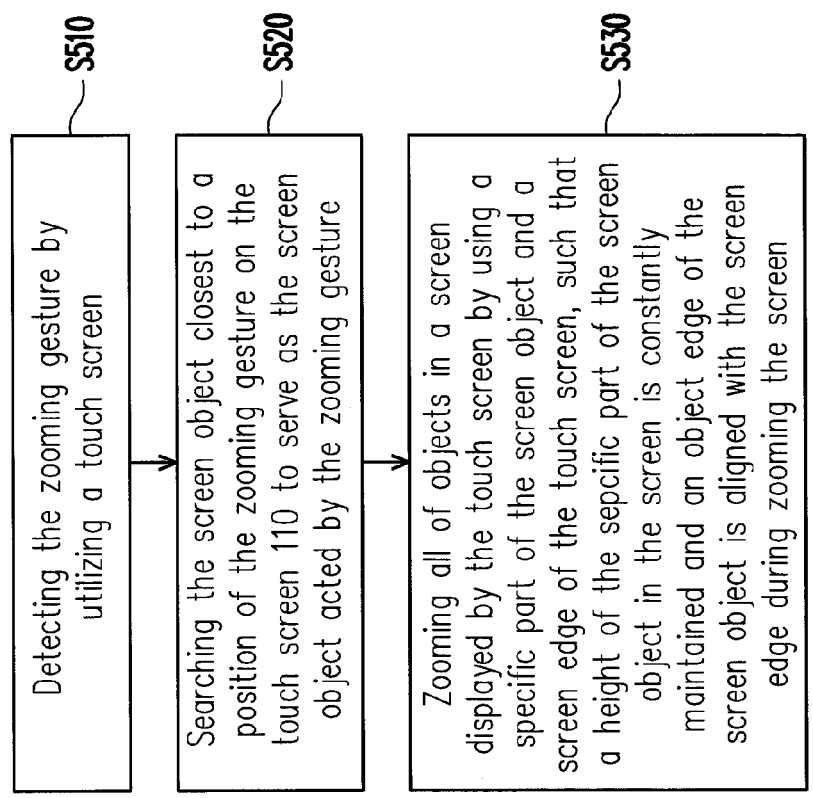
FIG. 5 is a flowchart of a method for zooming screen according to an example of the application.

FIG. 5 is a flowchart of a method for zooming screen according to an example of the application. The method proposed by the present example may be implemented by the electronic apparatus 100 depicted in FIG. 1, and each step of the present example is described in detail with reference to each element depicted in FIG. 1.

First, in step S510, the detecting module 121 may detect a zooming gesture by utilizing the touch screen 110. Step S510 is identical or similar to step S210 in the foregoing example, thus detailed content thereof is omitted hereinafter.

Next, in step S520, the searching module 122 may search the screen object closest to a position of the zooming gesture on the touch screen 110 to serve as the screen object acted by the zooming gesture. In an example, by using the position of the zooming gesture as the reference, the searching module 122 may search the closest screen object sequentially in a horizontal direction and a vertical direction, or search the closest screen object sequentially in a left direction, a right direction, an up direction and a down direction, such that the screen object searched may serve as the reference for the zooming module 123 to zoom in the screen. Moreover, in another example, the searching module 122 may define a nine-square division with the position of the zooming gesture as a center, and searches the screen object appeared within the nine-square division and located at one square among the nine-square division closest to the position of the zooming gesture. In other words, the searching module 122 only searches the screen object within the nine-square division. In case the screen object is appeared in multiple squares, the squares including the screen object at closer positions (i.e. the squares of up, down, left, right) are preferentially selected. In case the screen object is not present in above-said squares, the squares including the screen object at farther positions (i.e., upper-left, upper-right, lower-left, lower-right) are then selected. Lastly, the screen object searched may serve as the reference for the zooming module 123 to zoom in the screen.

In addition, for the zooming gestures in different types, the present example also provides corresponding methods for determining the position of the zooming gesture. More specifically, in an example, in case the zooming gesture is the tap, the searching module 122 may adopt a touch position of the tap to serve as the position of the zooming gesture. Moreover, in case the zooming gesture is the double tap, the searching module 122 may adopt a last touch position of the double tap to serve as the position of the zooming gesture. Or, in case the zooming gesture is the pinch, the searching module 122 may adopt a center of a connection formed by the pinch to serve as the position of the zooming gesture. However, the implementation of the application is not limited thereto.

Afterwards, in step S530, the zooming module 123 uses a specific part of the screen object found by the searching module 122 and a screen edge of the touch screen 110 as a reference to zoom all of objects displayed in a screen of the touch screen 110, such that a height of the specific part of the screen object is constantly maintained during zooming the screen. Said step is identical or similar to step S230 in the foregoing example, thus detailed content thereof is omitted hereinafter.

Another example is further provided to specifically describe an implementation of using the screen object closest to the position of the zooming gesture as the reference for zooming the screen subsequently.

Figure 6C:
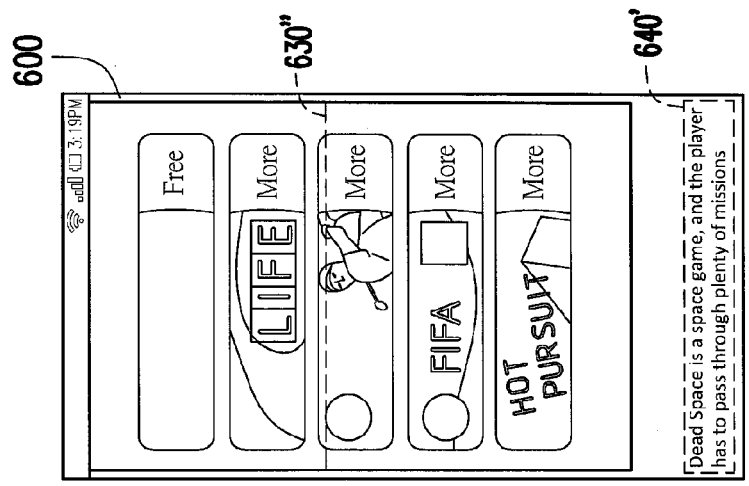
FIG. 6A to FIG. 6C are schematic diagrams for zooming screen according to an example of the application.
Figure 6B:
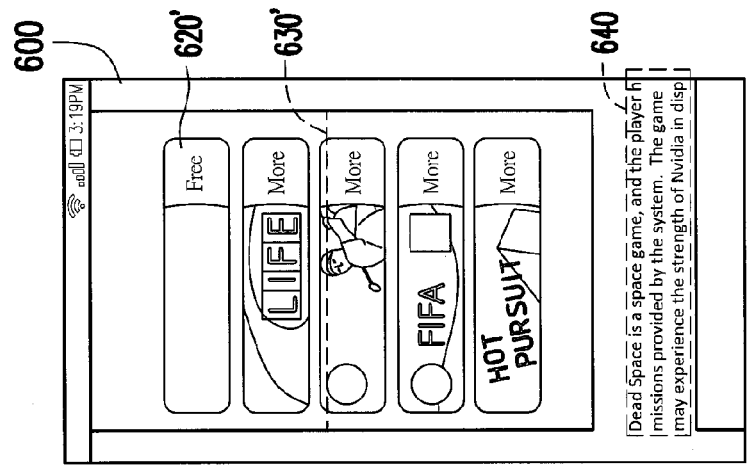
Figure 6A:
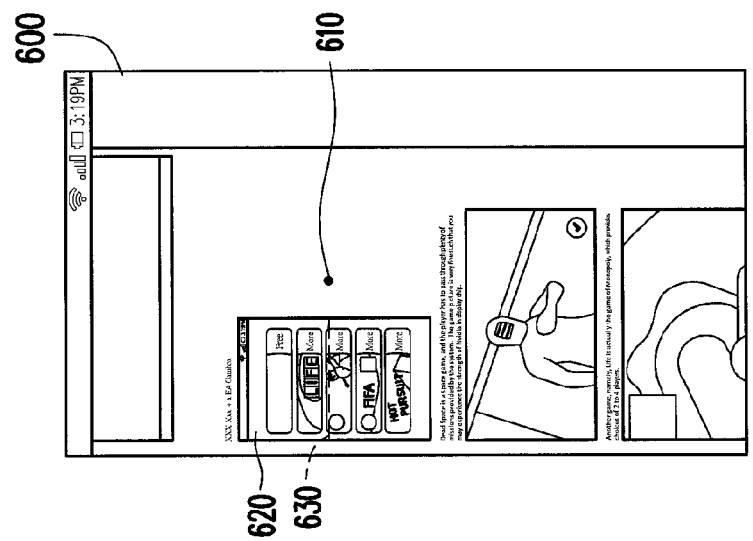

FIG. 6A to FIG. 6C are schematic diagrams for zooming screen according to an example of the application. Referring to FIG. 6A, it is assumed that the screen displayed by the touch screen 110 is a web page 600. In the present example, when the zooming gesture such as the double tap is acted by the user on a touch position 610, the searching module 122 may find the closest screen object (i.e., a picture 620) at a left side of the touch point 610.

After the picture 620 is found by the searching module 122, the zooming module 123 may zoom in all of objects (e.g., pictures and every word) in the web page 600 as shown in FIG. 6B. During the procedure of zooming in of the web page 600, the zooming module 123 zooms in the web page 600 by using a pixel row 630 corresponding to the touch position 610 and a left edge of the touch screen 110 (i.e., a left edge of the web page 600) as the reference, such that the left edge of the picture 620 after zoom in is aligned with the left edge of the touch screen 110, and the height of the pixel row 630 corresponding to the touch position 610 in the picture 620 is constantly maintained. During the procedure of zooming in of the web page 400, the picture 420 firstly becomes a picture 620' as shown in FIG. 6B, and then zoom in to a picture 620" as shown in FIG. 6C. In view of FIG. 6A to 6C, the heights of the pixel row 630, a pixel row 630' and a pixel row 630" are identical to each other. Accordingly, from the user's prospective, a part of the picture previously followed by the user may be easily found in the web page 600 after zoom in.

It should be noted that although the foregoing examples are illustrated with zoom in of the screen as examples, the method proposed by the examples may also be adapted when the user intends to zoom out the screen. For instance, when the user intends to zoom out the screen through the zooming gesture, in case the screen object acted by the zooming gesture is a text paragraph, the zooming module 123 may constantly maintain a height of a first line in the text paragraph during zoom out of all of objects in the screen. In case the screen object acted by the zooming gesture is a picture, the zooming module 123 may constantly maintain a height of a pixel row corresponding to a position of the zooming gesture in the picture during zoom out of all of the objects in the screen.

The present invention further provides a computer readable medium, for executing each step of the method for zooming screen. The computer program consists of a plurality of code segments (for example, an organization chart establishing program code segment, a form signing program code segment, a setting program code segment, and a deployment program code segment) and after the program code segments are loaded in the portable apparatus and executed, the steps of the method for zooming screen are carried out.

To sum up, in the method for zooming screen, the electronic apparatus and the computer readable medium using the same proposed in the examples of the application, when the zooming gesture is detected, each of the objects in the screen may be zoomed according to the screen object acted by the zooming gesture while constantly maintaining the height of the specific part of the screen object. Moreover, even if the zooming gesture is acted by the user on the blank area of the screen, the application may still perform operations for zooming screen according to the screen object closest to the position of the zooming gesture. As a result, the user may easily find the picture or text previously followed in the screen after zooming without spending extra time and efforts in searching the screen after zooming.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A method for zooming screen, adapted to an electronic apparatus having a touch screen, and the method comprises:
   displaying a plurality of text paragraphs on the touch screen;
   detecting a zooming gesture by utilizing the touch screen;
   searching a first text paragraph of the text paragraphs acted by the zooming gesture on the touch screen; and
   performing a zooming operation to zoom all objects displayed in a screen displayed by the touch screen by using a first line of the first text paragraph and left and right screen edges of the touch screen as a reference,
   wherein a first distance between the upper edge of the first line and an upper screen edge of the touch screen before the zooming operation and a second distance between the upper edge of the first line and the upper screen edge of the touch screen after the zooming operation are identical and an object edge of the first text paragraph is aligned with the left and right screen edges.

2. The method of claim 1, wherein the step of searching the first text paragraph of the text paragraphs acted by the zooming gesture on the touch screen comprises:
   searching the first text paragraph closest to a position of the zooming gesture on the touch screen to serve as the first text paragraph acted by the zooming gesture.

3. The method of claim 2, wherein the step of searching the first text paragraph of the text paragraphs closest to the position of the zooming gesture on the touch screen comprises:
　　defining a nine-square division with the position of the zooming gesture as a center; and
　　searching the first text paragraph appeared within the nine-square division and located at one square among the nine-square division closest to the position of the zooming gesture.

4. The method of claim 1, further comprising:
　　rearranging the text paragraphs in the screen according to a screen width of the touch screen, such that a width of each line in the text paragraphs is matched to the screen width of the touch screen.

5. The method of claim 1, wherein the zooming gesture comprises a tap, a double tap or a pinch.

6. An electronic apparatus, comprising:
　　a touch screen displaying a plurality of text paragraphs;
　　a storage unit configured to store a plurality of modules; and
　　a processing unit coupled to the touch screen and the storage unit, and configured to access and execute the modules stored by the storage module, wherein the modules comprise:
　　　　a detecting module, detecting a zooming gesture by utilizing the touch screen;
　　　　a searching module, searching a first text paragraph of the text paragraphs acted by the zooming gesture on the touch screen; and
　　　　a zooming module, performing a zooming operation to zoom all objects displayed in a screen displayed by the touch screen by using a first line of the first text paragraph and left and right screen edges of the touch screen as a reference, wherein a first distance between the upper edge of the first line and an upper screen edge of the touch screen before the zooming operation and a second distance between the upper edge of the first line and the upper screen edge of the touch screen after the zooming operation are identical and an object edge of the first text paragraph is aligned with the left and right screen edges.

7. The electronic apparatus of claim 6, wherein the searching module searches the first text paragraph closest to a position of the zooming gesture on the touch screen to serve as the first text paragraph acted by the zooming gesture.

8. The electronic apparatus of claim 7, wherein the searching module defines a nine-square division with the position of the zooming gesture as a center, and searches the first text paragraph appeared within the nine-square division and located at one square among the nine-square division closest to the position of the zooming gesture.

9. The electronic apparatus of claim 6, further comprising:
　　an adjusting module configured to rearrange the text paragraphs in the screen according to a screen width of the touch screen, such that a width of each line in the text paragraphs is matched to the screen width of the touch screen.

10. The electronic apparatus claim 6, wherein the zooming gesture comprises a tap, a double tap or a pinch.

11. A non-transitory computer readable medium for recording a program configured to be loaded by an electronic apparatus to execute steps of:
　　displaying a plurality of text paragraphs on the touch screen;
　　detecting a zooming gesture by utilizing the touch screen;
　　searching a first text paragraph of the text paragraphs acted by the zooming gesture on the touch screen; and
　　performing a zooming operation to zoom all objects displayed in a screen displayed by the touch screen by using a first line of the first text paragraph and left and right screen edges of the touch screen as a reference, wherein a first distance between the upper edge of the first line and an upper screen edge of the touch screen before the zooming operation and a second distance between the upper edge of the first line and the upper screen edge of the touch screen after the zooming operation are identical and an object edge of the first text paragraph is aligned with the left and right screen edges.

* * * * *